(12) United States Patent
Atkinson

(10) Patent No.: US 6,267,388 B1
(45) Date of Patent: Jul. 31, 2001

(54) VEHICLE

(75) Inventor: Christopher Stephen Atkinson, Worcestershire (GB)

(73) Assignee: Formula GP Limited, Slough (GB)

(*) Notice: Subject to any disclaimer, the term of this patent is extended or adjusted under 35 U.S.C. 154(b) by 0 days.

(21) Appl. No.: 09/404,642

(22) Filed: Sep. 23, 1999

(51) Int. Cl.[7] ............................. B62D 7/08; B62D 7/18; B62D 7/20; B62D 9/04
(52) U.S. Cl. ............................. 280/6.157; 280/86.757; 280/93.512; 280/124.103; 280/771
(58) Field of Search ............................. 280/6.157, 43.17, 280/43.2, 86.751, 86.757, 103, 93.512, 93.502, 771, 124.103, 124.136, 124.138, 124.139

(56) References Cited

U.S. PATENT DOCUMENTS

| | | | |
|---|---|---|---|
| 3,485,506 | * 12/1969 | Melbar et al. | 280/124.103 |
| 3,567,243 | * 3/1971 | Ruhlin | 280/86.757 |
| 3,656,571 | 4/1972 | Canfield . | |
| 4,373,743 | * 2/1983 | Parsons, Jr. | 280/86.757 |
| 5,246,245 | 9/1993 | Sato et al. . | |
| 5,284,353 | * 2/1994 | Shinji et al. | 280/86.751 |
| 5,350,183 | 9/1994 | Shealy . | |
| 6,039,335 | * 3/2000 | Sheridan | 280/86.751 |

FOREIGN PATENT DOCUMENTS 2 265 874    10/1993  (GB) .

* cited by examiner

Primary Examiner—Peter C. English
(74) Attorney, Agent, or Firm—Young & Thompson

(57) ABSTRACT

A modified racing vehicle having dimensions such that it can run on a track suitable for a conventional go-kart and which has substantially the characteristics of a single seater formula racing car. The vehicle has no differential on its rear axle (2) and no suspension on its rear and front axles (5) but is provided with weight transfer structure to compensate therefor. The steering geometry of the vehicle is arranged such that, for the radially outer steerable wheel with reference to a turning centre, a castor angle of the kingpin axis increases and the kingpin axis is inclined into the turn as the steering member (6) pivots and the outer steerable wheel is lifted upwards forcing the chassis (1) down whereby a downward force is exerted through the chassis (1) to a non-steerable wheel (4) that is the radially outer with reference to the turning center.

6 Claims, 3 Drawing Sheets

VEHICLE

FIELD OF THE INVENTION

The invention relates to a modified racing vehicle such as a racing car.

BACKGROUND OF THE INVENTION

In order to extend access to motor racing events and to reduce the costs thereof, there exists a need for a racing car having a size such that it can run on a track suitable for a conventional go-kart but which retains the appearance and characteristics of a conventional single seater formula car.

To produce a suitable vehicle for this purpose it is desirable that the following objectives are met to a broad extent:
1. The size of the vehicle is such that it can run on a track suitable for a go-kart i.e. the vehicle is small compared with a conventional single seater formula racing car;
2. The vehicle is inexpensive to build and requires little maintenance;
3. The vehicle has sufficient in-built strength to resist significant damage from average crashes encountered on a racing circuit; and
4. The vehicle can be easily handled by a novice driver yet is challenging and exciting for the experienced driver.

To meet these objectives a racing vehicle can be designed which has a space frame chassis similar to that of a conventional single seater formula car but which has restricted dimensions to enable it to be raced successfully on go-kart tracks such as those presently in use, in particular the larger outdoor go-kart tracks. The limited size of the chassis of the vehicle thus produced leads to a reduction in the space available within it for components and restricts further design modifications to the vehicle.

To produce a vehicle having a chassis of suitable restricted size, it is proposed in the present invention to design the vehicle without a differential on the rear axle and without a resilient suspension component on the rear and front axles.

The proposed design of the invention creates an inherent handling problem, in that the fixed rear axle without a differential resists turns and tends to proceed in a straight line thereby creating understeer or an inherent resistance to turning corners in the vehicle. The removal of the resilient suspension components and the increased weight in comparison to a go-kart increases the severity of the problem.

Steering systems are known such as the double wishbone type, generally comprising a hub carrier for rotatably supporting a front wheel, and upper and lower linkages for connecting upper and lower ends of the hub carrier to a vehicle body. According to such conventional wishbone arrangements, the kingpin axis about which the hub is carried and about which the wheel rotates, is theoretically fixed even during the steering operation. The camber characteristics of the vehicle are determined by the castor angle, i.e. the inclination of the kingpin axis to the longitudinal axis of the vehicle. The cornering performance during steering is primarily influenced by the cornering power of an outer front wheel, situated on an outer side with reference to a cornering centre. During steering the vehicle body rolls, which tends to increase the camber angle of the outer front wheel and hence the tyre inclination angle with reference to the ground surface in the positive camber direction, thereby lowering the cornering power of the outer front wheel. Vehicles incorporating such systems require full suspension systems if they are to operate effectively.

OBJECT OF THE INVENTION

It is an object of the present invention to provide a racing vehicle having dimensions such that it can run on a track suitable for a conventional go-kart and having substantially the characteristics of a single seater formula car except that it has substantially no differential on its rear axle and no resilient suspension on its rear and front axles and it is provided with weight transfer means to reduce the weight on the road of a rear inner wheel of a turn by transferring weight from the rear inner wheel to the rear outer wheel as the vehicle goes through its turn. The means of weight transfer produces an effect similar to a differential and enables the rear wheels to turn "differentially" notwithstanding that they are on a fixed, rotatable axle. Suitably the weight transfer means is a steering geometry of the front wheels designed with angles such as to create a twisting motion in the chassis as the front wheels of the vehicle are turned, which is transmitted directly to the rear axle through the chassis thereby producing the weight transfer required. The geometry which is suitable depends upon the dimensions of the vehicle, in particular upon its wheelbase.

SUMMARY OF THE INVENTION

Accordingly, the invention provides a vehicle of the type comprising a space frame chassis supporting a pair of non-steerable wheels, a pair of steerable wheels, and having a steering system including a steering member carrying a stub axle, upper and lower suspension linkages pivotally connecting upper and lower ends ol said steering member to the vehicle chassis, the steering member is supported by said linkages for pivotal movement about a kingpin axis through said upper and lower ends, wherein the steering geometry is arranged such that, for the radially outer steerable wheel with reference to a turning centre, a castor angle of the kingpin axis increases and the kingpin axis is inclined into the turn as the steering member pivots and said outer steerable wheel is lifted upwards forcing the chassis down whereby a downward force is exerted through said chassis to a non-steerable wheel that is the radially outer wheel with reference to said turning centre. The angles producing the effect are the castor angle and, especially, the Kingpin inclination angle. The castor angle is increased for the outer steerable wheel. A Kingpin inclination angle arises by virtue of a special angle (stub angle) present at or near a middle portion of the strut or steering member supporting the stub axle for the front wheel. Conveniently the stub axle is located on a substantially upright, lower portion of the strut.

The steering member may comprise a strut having a pair of sections set at an angle to each other. The angle, the stub angle, is preferably within the range 148° to 164°, more preferably within the range 155° to 160°. In a preferred embodiment the stub angle is 159°.

There are substantially no resilient suspension components associated with any of the wheel axles. The presence of resilient suspension components, such as suspension springs, would prevent the required transfer of weight to the outer rear wheel.

A further linkage may connect said lower linkage to the chassis so as to prevent or substantially limit pivotal movement of the lower linkage about an axis parallel with the longitudinal axis of the chassis. The lower linkage may comprise a pair of tie rods mounted at locations spaced apart on the vehicle chassis and mounted for pivotal movement around an axis parallel with the longitudinal axis of the chassis, whereby adjustment of the length of said further linkage allows adjustment of the ride height of the vehicle.

The upper linkage may comprise a pair of tie rods mounted at locations spaced apart on the vehicle chassis and mounted for pivotal movement around an axis normal to the longitudinal axis of the chassis. The tie rods of the upper and lower linkages may have retaining means at their ends distal from the chassis for retaining a portion of a respective end of said steering member so as to form upper and lower universal or omni-axial joints.

The tie rods are of adjustable lengths allowing control of the king pin inclination and castor angles. Setting the tie rods at desired lengths allows control of the lengths of the linkages and therefore the relative positions of the ends of the steering member, which determines both the castor angle and the kingpin inclination angle. The ride of the vehicle and the amount of weight transferred while cornering, can be controlled before use of the vehicle.

The vehicle may have a wheelbase within the range 1480 to 1580 millimeters. The vehicle may have an overall length within the range 2160 mm to 2760 mm, an overall width within the range 1335 mm to 1415 mm and a weight within the range 210 to 225 kilograms.

The vehicle may be a racing car with partially enclosed body of the formula one type. The vehicle may have seating for one adult person.

In an embodiment the non-steerable wheels are located on a fixed axle and are driven by a variable speed belt driven torque converter which drives a half shaft which in turn drives the rear wheels through a chain link connection to the fixed axle.

The Kingpin inclination angle is the angle that causes the front wheel to tip outwards from its top towards the centre line as the front wheel is turned outwards and then the opposite effect is caused as the wheel is turned inwards in each case from the wheel's centre position.

The angle in the strut supporting the stub axle (i.e. the stub angle) is that which influences the correct degree of weight transfer for the size and weight of the vehicle of the invention. The angle especially preferred for a suitable wheelbase is 159° and this creates the desired effect. Too little weight transfer does not permit the car to turn and the effect is lost. Too much weight transfer causes the car to turn too sharply with a tendency to spin out of control.

The tolerance level in the stub axle is more critical as the angle is increased and suitably this angle is not increased by more than 5° above the optimum level i.e. to 164°. The other way i.e. reducing the stub angle the tolerance level is less critical and a decrease to 148° still allows the car to be controlled satisfactorily.

In this specification the term wheelbase means the measurement between the centres of the hubs of the front and rear wheels of the vehicle. Suitably the wheelbase is within the range 1480 to 1580 millimeters. For a vehicle with such a wheelbase, the stub angle is of the order described above that is suitably within the range 148° to 164°; preferably 155° to 160° and especially 159°. The optium angle in any given instance will depend upon the wheelbase (i.e. the longer the wheelbase the larger the angle needed to turn). The preferred wheelbase will depend upon the conditions under which the vehicle is intended to race—particularly the type and scale of the racing track. The vehicle is designed for a person to sit in it. In the vehicle of the invention there is preferably no rear differential and no suspension. The rear axle is preferably a fixed beam axle. Without the arrangements proposed in the invention it would not be possible properly to control the rear wheels as the vehicle went round a corner. The rear wheels would have a tendency to carry straight on. The effect of the invention is to lift the pressure from the inside rear wheel and to increase the pressure on the outer rear wheel.

In the steering geometry of the vehicle of the invention the steering column is connected to the front steerable wheels via angled struts having the appropriate strut angles therein.

Suitably the vehicle of the invention is a racing car having some or all of the following characteristics:

A. A space frame chassis with integral roll bar, similar to that of a typical conventional racing car but with its size restricted to able it to be raced on a larger outdoor go-kart track. A suitable car has an overall length in the range 2160 to 2760 millimeters and an overall width in the range 1335 to 1415 millimeters.

B. A partially enclosed body similar to that of a formula car with an open cockpit for the driver. Preferably the chassis is formed from material comprising fibreglass particularly fibreglass strengthened with "KEVLAR" (RTM) strengthening agent.

C. Seating for the driver which is suitable for an adult person in a reclined position similar to that of a formula one car, the seat being fitted with full racing harness.

D. Larger tires of the size and kind now used in the racing class known as Mini Miglia—are either dry tires for dry conditions or wets for wet conditions suitable sizes being dry 180 mm R10s or wet 165 mm R10s.

E. A rack and pinion steering mechanism similar to that used in formula one racing cars and which is recently beginning to be adopted in the more advanced go-karts, to give precise steering with maximum feel for the driver.

In the vehicle of the invention the need for a gearbox and manual clutch can be replaced by adopting a variable speed belt driven torque converter which drives a half shaft which in turn drives the rear wheels through a chain link connection to the fixed axle. This is a unique application of the torque converter which produces a constantly variable gear ratio according to the speed of the vehicle and not the revolutions of the engine thereby maximising the performance of the engine by using optimum torque, usually at all times.

The vehicle contains an engine of suitable size. Its design enables engine size to be reduced, e.g. to 20 horsepower, thus reducing costs while still producing satisfactory acceleration and performance sufficient to challenge an experienced driver.

The weight of the vehicle is suitably within the range 200 to 230 kilograms, particularly 210 to 225 kilograms. Generally a vehicle of approximately 215 kilograms weight is especially suitable for most purposes. To produce a design having satisfactory strength it is preferred in the construction of the vehicle to use mild steel square tubing (e.g. BS 4360-42B) to cater for a broad range of driver weight and size and to resist damage sustained in average crashes.

BRIEF DESCRIPTION OF THE DRAWINGS

The invention will now be described in more detail and with reference to the accompanying drawings in which.

DETAILED DESCRIPTION OF THE INVENTION

Figure 1:
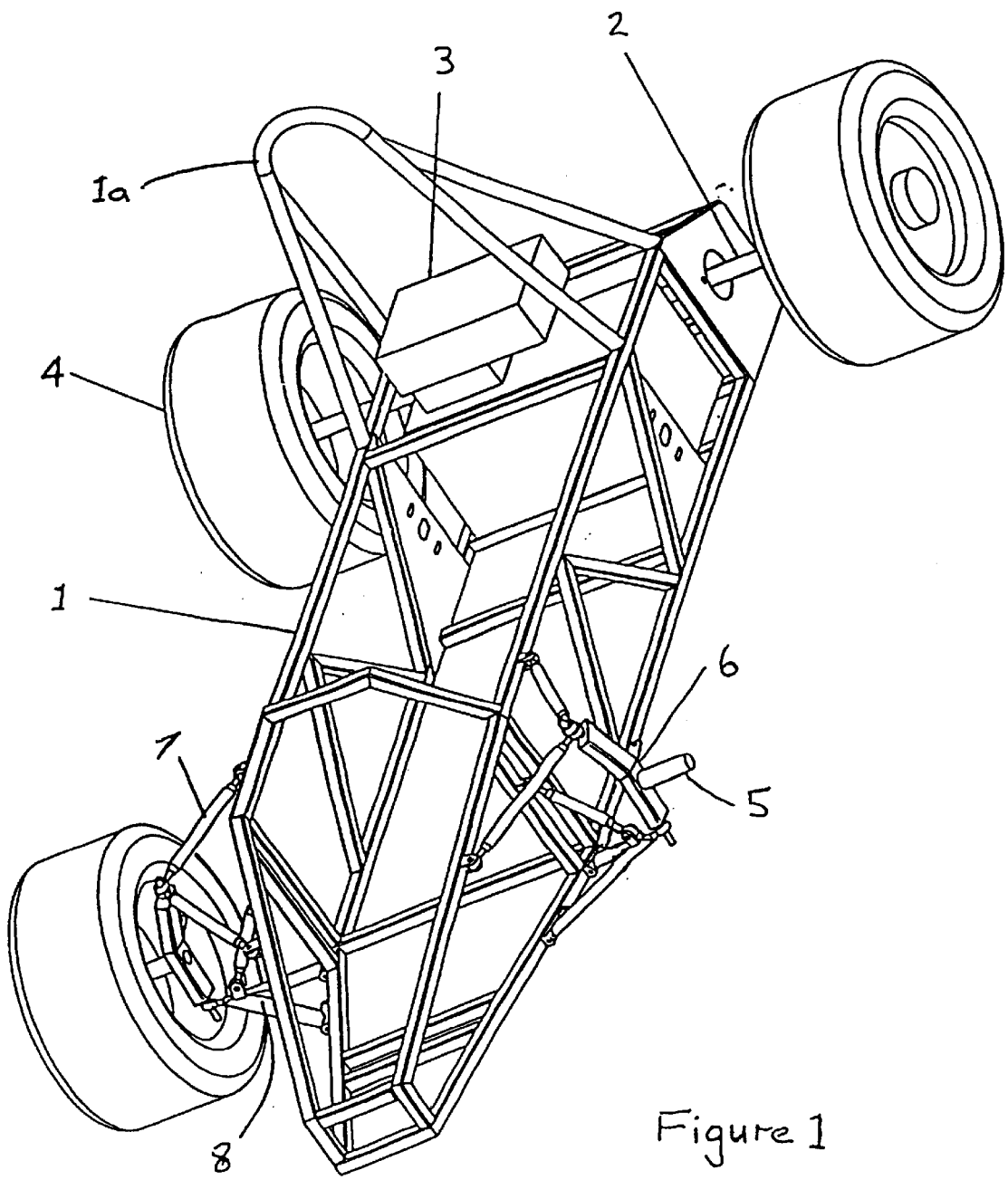
FIG. 1 is a perspective view of a chassis layout of a vehicle according to the present invention.

Referring to FIG. 1, a racing car chassis 1 is shown incorporating the steering system of the invention. The chassis 1 is a space frame supporting at a rear end a fixed axle 2 driven by a motor shown generally at 3. The chassis 1 also supports at a rear end a roll bar 1a. The rear axle supports a suitably proportioned racing wheel 4 at each end.

The front wheels (one shown) are supported on stub axles 5 at the front end of the chassis by a set of linkages, which will be described in more detail below.

Figure 2:
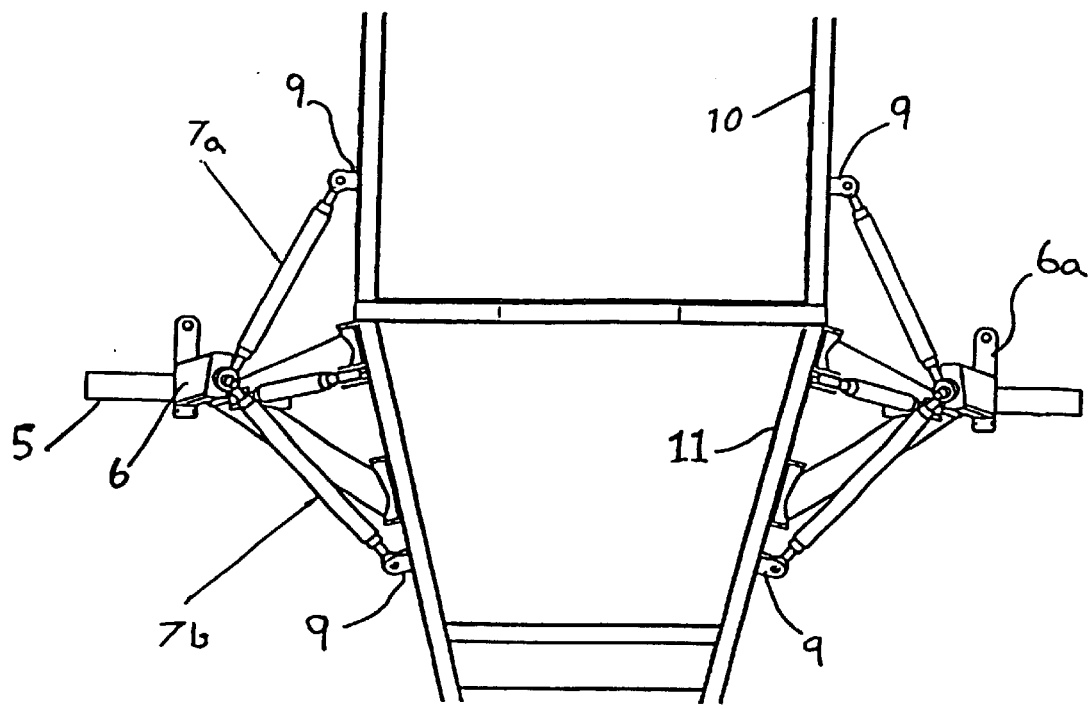
FIG. 2 is a plan view of a steering system according to the present invention.

FIGS. 2 shows a plan view of the nose of the chassis 1, that portion which is forward of the driving position. Two opposed stub axles 5 each extend generally at right angles to a lower portion of respective steering members or struts 6. When the car rests with its wheels on flat ground, such as a racetrack, the lower portion of the strut 6 is generally vertical. FIG. 2 shows most clearly the steering shoulders 6a which are used to connect the steering system to, for example, a rack and pinion steering mechanism (not shown).

Figure 3:
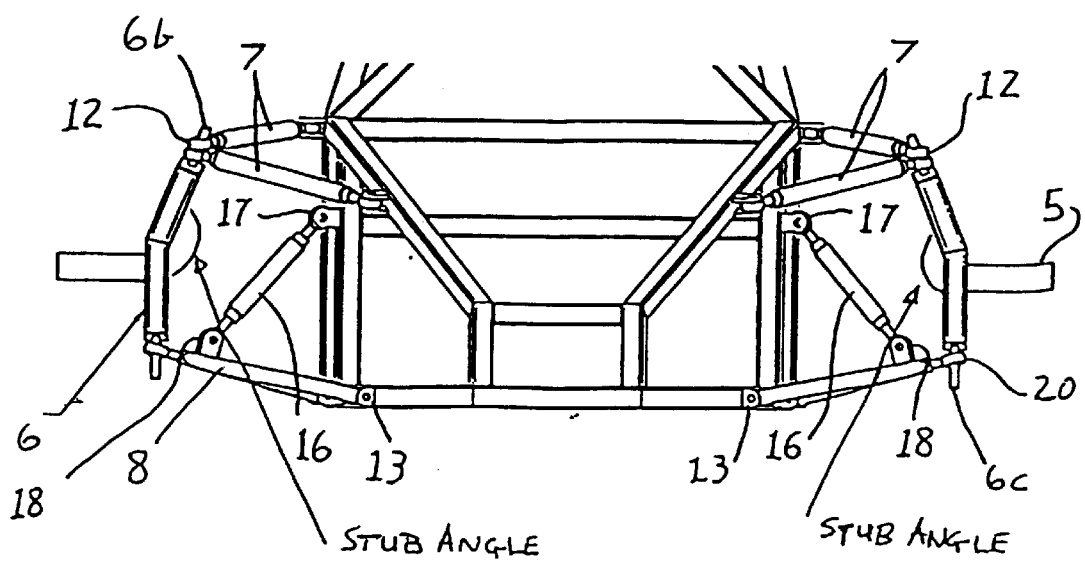
FIG. 3 is a front elevation of a steering system according to the invention.

FIG. 3 is a front view of the same portion of the chassis 1 shown in FIG. 2 from which it can be seen that the struts 6 are supported by upper and lower linkages 7 and 8. Each strut 6 is formed with a bend therein such that there are two sections, upper and lower. The upper and lower section of the strut 6 form an inner angle, opposing the chassis, labelled as the 'stub angle' in FIG. 3. This is discussed in more detail below. Each linkage 7, 8 is formed by a pair of tie rods 7a, 7b, 8a, 8b of approximately equal length. The lengths of the tie rods are adjustable as discussed below. As shown in FIG. 2, the upper linkage 7 has a pair of tie rods 7a, 7b supported at one end on the chassis 1 in brackets 9 mounted on upper chassis frame members or portions 10 and 11. The tie rods 7a, 7b are mounted in the brackets 9 for pivotal movement around an axis generally perpendicular to the frame members 10 and 11. The distal ends of the tie rods 7a, 7b of linkage 7 each terminate in a ring and form a rose joint 12 with an upper pin 6b of the strut 6. The pin rings pass over the pin 6b in overlapped relation and abuts a shoulder of the strut 6. The pin 6b is freely rotatable within the rings.

The lower linkage 8 has a pair of tie rods 8a, 8b that are supported in brackets 13 mounted on lower chassis frame members 14. The frame members or portions 14, 15 are shown best in FIGS. 4 to 6. The brackets 13 are orientated such that the tie rods are supported for pivotal movement about their ends around an axis parallel with the lower chassis frame members 14, 15.

Figure 4:
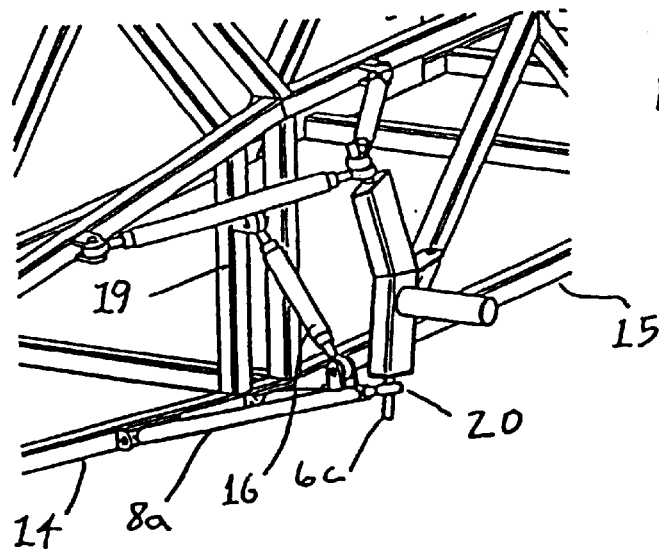
FIG. 4 is a side perspective view from the front of a stub axle and linkage assembly according to the invention.
Figure 5:
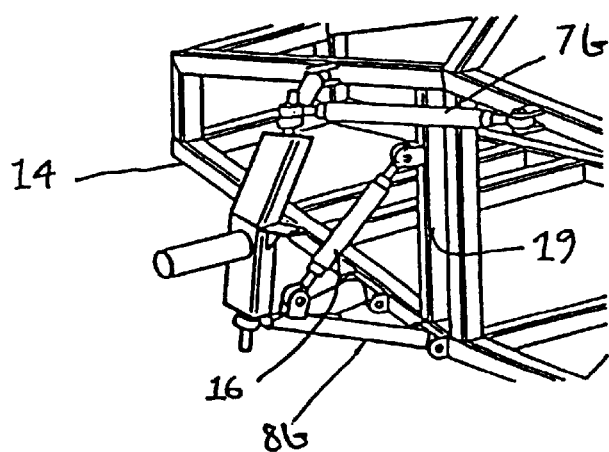
FIG. 5 is a side perspective view from behind of the assembly shown in FIG. 4.

Referring to FIGS. 3, 4 and 5, a further tie rod 16 is shown for each strut 6 and which acts as a ride height adjuster. Each tie rod 16 is mounted at its ends in brackets 17 and 18. The bracket 17 is mounted to an upright chassis frame member 19 and supports the tie rod 16 for pivotal movement about an axis perpendicular to the upright member 19. The other end of the tie rod 16 is pivotally mounted in a bracket 18 in a similar manner to bracket 17. Bracket 18 is located towards the distal ends of the tie rods forming the lower linkage 8 with opposing bracket posts on each tie rod.

The distal end of the tie rods 8a, 8b of the lower linkage 8 form a lower rose joint 20 with a lower pin 6c of the strut 6. The lower rose joint 20 is substantially the same as the upper rose joint 12. Because the lower linkage 8 is pivotally moveable up and down (when not fixed by the tie rod 16) the length of the tie rod 16 can be adjusted to set the ride height of the car. The weight of the car is supported on the wheels through the rose joint 20. The position of the lower rose joint 20 relative to the chassis is controlled by the length of the tie rod 16. Thus, adjustment of the tie rod 16 gives convenient adjustment of the ride height.

Figure 6:
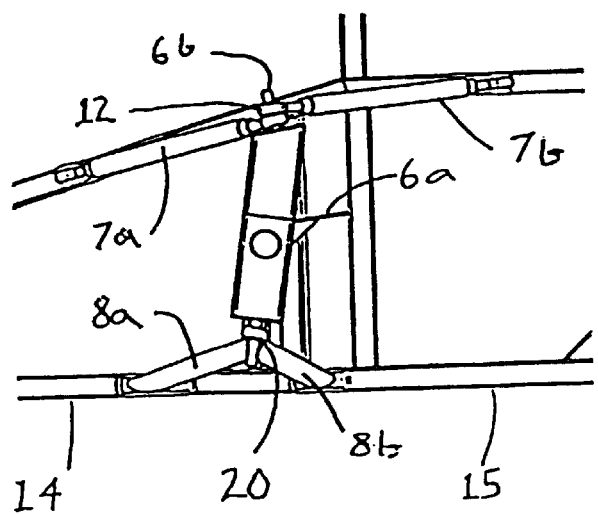
FIG. 6 is a side view of the assembly shown in FIGS. 4 and 5.

Referring to FIGS. 4 to 6 and particularly FIG. 6, the arrangement of the linkages 7 and 8 can clearly be seen. FIG. 6 is a left side view (taken from the driving position). The position of the upper rose joint 12 is shown to be rearward of the lower rose joint 20. The strut 6, therefore, is orientated with a castor angle, the angle to the perpendicular of the strut 6 when viewed from the side. The castor angle is partly responsible for the transfer of weight achieved by using the steering system of the present invention. It is a particular feature of the present invention that this castor angle can be adjusted by adjusting the lengths of the tie rods of the upper linkage 7 and thereby adjusting the position of the upper rose joint 12 relative to the longitudinal axis of the chassis 1.

Referring again to FIG. 3, the stub angle is 159° and the length of the tie rods of the upper linkage 7 is set so that the lower portion of the strut 6 is upright when the car is not being steered through a turn. The upper rose joint 12 is, in this embodiment, positioned slightly inwardly of the lower rose joint 20. It can be seen that the upper pin 6b passes through the rings of the tie rods at an angle.

From the figures, it can be seen that as the wheels are turned for a car to take a corner, the presence of the stub angle will cause the castor angle on the outer, front wheel to increase as the strut 6 rotates. At the same time as the stub angle rotates away from the chassis, a kingpin or camber angle is introduced as the lower portion of the strut 6 leans inwards. The outer front wheel is therefore, lifted up and the chassis down. This movement is transmitted by the chassis to the rear outer wheel, which is forced down. The opposite occurs in respect of the inner wheels. As the strut 6 rotates the castor angle decreases and the kingpin angle which is formed is parallel to that of the strut on the outer wheel such that the lower portion of the strut leans outwardly as does the inner wheel. The inner wheel is forced down and the chassis up thereby transferring weight from the rear inner wheel to the rear outer wheel. This movement of the chassis is transmitted to the axle and the inner rear wheel is forced up.

Whilst an embodiment of the invention has been described, modification will suggest themselves to those skilled in the art which do not depart from the scope of the invention as defined in the appended claims. For instance the relative orientations of portions of the strut to the stub axle are entirely within the skilled man's selection so long as the wheels are correctly orientated. The embodiment describes a strut having two straight section parts, however, a curved steering member would provide the same effect. Furthermore, whilst rose joints have been used in the presently described embodiment to joint the linkages to the upright strut, more complicated joints could be used in their place.

What is claimed is:

1. A vehicle comprising a space frame chassis having longitudinal chassis members and supporting a pair of non-steerable wheels, a pair of steerable wheels, and having a steering system including a steering member carrying a stub axle, comprising a strut having a pair of sections set at a stub angle to each other, upper and lower suspension linkages pivotally connecting upper and lower ends of said steering member to the vehicle chassis, said upper linkage being connected to a said longitudinal chassis member for pivotal movement about an axis perpendicular to said longitudinal chassis member and said lower linkage being connected to a said longitudinal chassis member for pivotal movement about an axis parallel to the last-named chassis member, the steering member being supported by said linkages for pivotal movement about a kingpin axis through said upper and lower ends, wherein the steering geometry is arranged such that, for the radially outer steerable wheel with reference to a turning center, a castor angle of the kingpin axis increases and the kingpin axis is inclined into the turn as the steering member pivots and said outer steerable wheel is lifted upwards forcing the chassis down whereby a downward force is exerted through said chassis to the non-steerable wheel that is the radially outer with reference to said turning center, wherein said stub angle is within the range 148° to 164°.

2. A vehicle according to claim 1, wherein said stub angle is within the range 155° to 160°.

3. A vehicle according to claim 1, wherein said stub angle is 159°.

4. A vehicle comprising a space frame chassis having longitudinal chassis members and supporting a pair of non-steerable wheels, a pair of steerable wheels, and having a steering system including a steering member carrying a stub axle, comprising a strut having a pair of sections set at a stub angle to each other, upper and lower suspension linkages pivotally connecting upper and lower ends of said steering member to the vehicle chassis, said upper linkage being connected to a said longitudinal chassis member for pivotal movement about an axis perpendicular to said longitudinal chassis member and said lower linkage being connected to a said longitudinal chassis member for pivotal movement about an axis parallel to the last-named chassis member, the steering member being supported by said linkages for pivotal movement about a kingpin axis through said upper and lower ends, wherein the steering geometry is arranged such that, for the radially outer steerable wheel with reference to a turning center, a castor angle of the kingpin axis increases and the kingpin axis is inclined into the turn as the steering member pivots and said outer steerable wheel is lifted upwards forcing the chassis down whereby a downward force is exerted through said chassis to the non-steerable wheel that is the radially outer with reference to said turning center, wherein a further linkage connects said lower linkage to the chassis so as to substantially limit pivotal movement of the lower linkage about an axis parallel to a said longitudinal chassis member.

5. A vehicle as claimed in claim 4, wherein the lower linkage comprises a pair of tie rods mounted at locations spaced apart on the vehicle chassis and mounted for pivotal movement around an axis parallel to a said longitudinal chassis member, whereby adjustment of the length of said further linkage allows adjustment of the ride height of the vehicle.

6. A vehicle comprising a space frame chassis having longitudinal chassis members and supporting a pair of non-steerable wheels, a pair of steerable wheels, and having a steering system including a steering member carrying a stub axle, comprising a strut having a pair of sections set at a stub angle to each other, upper and lower suspension linkages pivotally connecting upper and lower ends of said steering member to the vehicle chassis, said upper linkage being connected to a said longitudinal chassis member for pivotal movement about an axis perpendicular to said longitudinal chassis member and said lower linkage being connected to a said longitudinal chassis member for pivotal movement about an axis parallel to the last-named chassis member, the steering member being supported by said linkages for pivotal movement about a kingpin axis through said upper and lower ends, wherein the steering geometry is arranged such that, for the radially outer steerable wheel with reference to a turning center, a castor angle of the kingpin axis increases and the kingpin axis is inclined into the turn as the steering member pivots and said outer steerable wheel is lifted upwards forcing the chassis down whereby a downward force is exerted through said chassis to the non-steerable wheel that is the radially outer with reference to said turning center, wherein the upper linkage comprises a pair of tie rods mounted at locations spaced apart on the vehicle chassis.

* * * * *